(12) United States Patent  
Sasai et al.

(10) Patent No.: US 6,845,247 B1
(45) Date of Patent: Jan. 18, 2005

(54) COMMUNICATION TERMINAL APPARATUS AND SEAL-LIKE RECORDING MEDIUM

(75) Inventors: Takashi Sasai, Chiba (JP); Hiroaki Ogawa, Tokyo (JP); Shuji Yonekura, Kanagawa (JP); Tomoaki Nitta, Tokyo (JP); Erika Kobayashi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/601,601

(22) PCT Filed: Dec. 8, 1999

(86) PCT No.: PCT/JP99/06861

§ 371 (c)(1),
(2), (4) Date: Dec. 26, 2000

(87) PCT Pub. No.: WO00/35166

PCT Pub. Date: Jun. 15, 2000

(30) Foreign Application Priority Data

Dec. 8, 1998 (JP) .......................................... 10-348024

(51) Int. Cl.[7] .............................................. H04M 1/00
(52) U.S. Cl. ..................................... 455/550.1; 455/558
(58) Field of Search ................................ 455/550.1, 90, 455/558, 557, 556, 575.1, 564, 90.1, 90.2, 90.3, 556.1, 566, 575.8

(56) References Cited

U.S. PATENT DOCUMENTS 5,857,157 A * 1/1999 Shindo ........................ 455/551
6,223,026 B1 * 4/2001 Martschitsch ............... 455/407

* cited by examiner

Primary Examiner—Nick Corsaro
Assistant Examiner—Tu X Nguyen
(74) Attorney, Agent, or Firm—Jay H. Maioli

(57) ABSTRACT

When a seal-like recording medium with a built-in memory that stores information specifying a communicates is placed in the close proximity of a medium read/write unit of a communication terminal apparatus and a button is operated, information (operator in case of seal-like medium, and telephone number in case of seal-like medium) stored in the seal-like medium is read out.

8 Claims, 8 Drawing Sheets

US 6,845,247 B1

COMMUNICATION TERMINAL APPARATUS AND SEAL-LIKE RECORDING MEDIUM

TECHNICAL FIELD

The present invention relates to a communication terminal apparatus and a seal-like recording medium, and more particularly, to the communication terminal apparatus that is connected to a communicatee through a communication line and transmits/receives information to/from the communicatee, and the seal-like recording medium that records information used to connect such a communication terminal apparatus to communicatees.

BACKGROUND ART

Communication terminal apparatuses that can be carried by individuals all the time, such as portable telephones and Personal Handyphone Systems (PHS's), have recently been widely used, providing an environment that allows for communication anytime and anywhere.

Such a communication terminal apparatus normally comprises an interface being formed, for example, in its housing, through which information can be input to specify a communicatee to be connected. For example, the portable telephone apparatus provides numerical keys, a communication start key and a communication end key formed as a part of the housing.

There are also some communication terminal apparatuses in which a telephone directory is stored with interrelated names and telephone numbers of communicatees with whom the user frequently communicates, and connections to these communicatees can be made by operating predetermined keys or the like.

In order to further improve the portability of communication terminal apparatuses, it has been vigorously pursued in these days to make these apparatuses lighter and smaller. There was a problem, however, that if a communication apparatus were made smaller, the user interface contained in the body of the apparatus (e.g. operation keys such as numerical keys) would also be made smaller accordingly, resulting in reduced operability.

In addition, not only for the portable communication terminal apparatus but also for a desktop communication terminal apparatus, there was another problem that if the information used for accessing a communicatee had been leaked to a third party, e.g. telephone number, a connection request could be attempted by an irrelevant person to the detriment of the user.

Furthermore, since a connection request from another person may be made at any time, e.g. midnight, without any consideration for the receiving user's convenience, there was yet another problem that a burden could be forced on the user who receives such a call.

DISCLOSURE OF THE INVENTION

In view of the above, the present invention has been made with a first object to provide a communication terminal apparatus that allows for an improved operability of interface without preventing any miniaturization of the apparatus.

In addition, the present invention has a second object to provide a seal-like recording medium that allows for the prevention of the leakage of information used to access communicatees such as telephone numbers to an irrelevant third party, and allows for communications made during a period or time period convenient for the communicatees.

In order to provide solutions for these objectives, a communication terminal apparatus according to the present invention that is connected to a communicatee through a communication line and transmits/receives information to/from the communicatee comprises communication controlling means that executes controls required for the transmission/reception of information through the communication line, read-out means for reading out information recorded on a seal-like recording medium pasted anywhere at discretion, and connecting means that connects a communication line to the communicatee corresponding to the information read out by the read-out means.

In this communication terminal apparatus, the communication controlling means executes controls required for transmitting/receiving information through the communication line. The read-out means reads out information recorded on the seal-like recording medium pasted anywhere at discretion. The connecting means connects a communication line to the communicatee corresponding to the information read out by the read-out means. As a result, it is possible to improve the operability of the communication terminal apparatus.

In addition, the seal-like recording medium according to the present invention has adhesives applied to the back surface to allow for pasting anywhere at discretion and a communicatee's image displayed on the front surface, as well as the information required for connecting a line to the communicatee is recorded. As a result, this seal-like recording medium allows for definite selection of the communicatee by referring to the image displayed on the surface.

BEST MODE FOR CARRYING OUT THE INVENTION

An exemplary embodiment of the present invention will now be described in detail with reference to the drawings.

Figure 1:
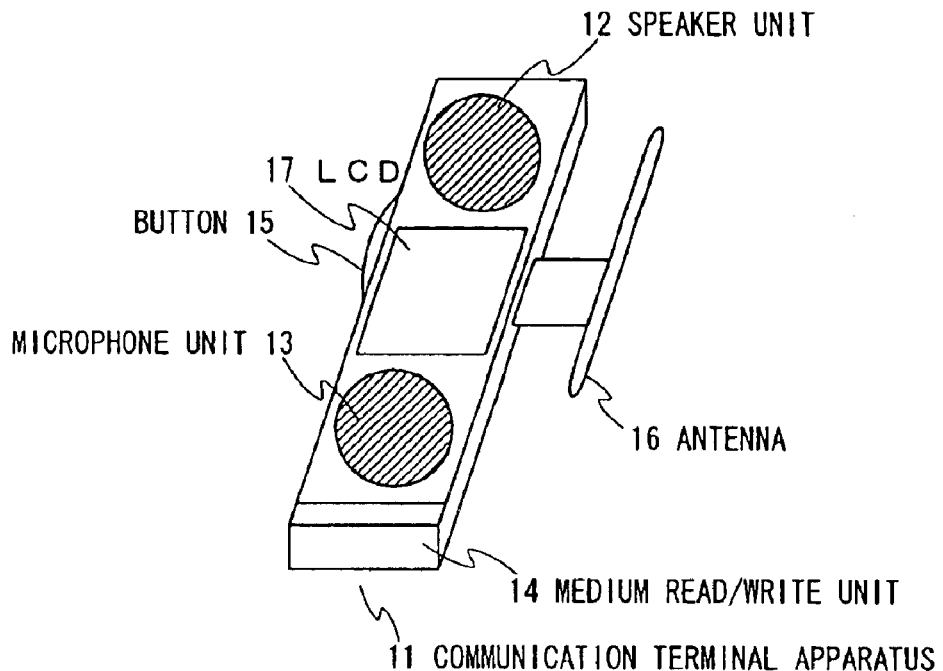
FIG. 1 is a diagram showing the configuration of the embodiment according to the present invention.
Figure 1:
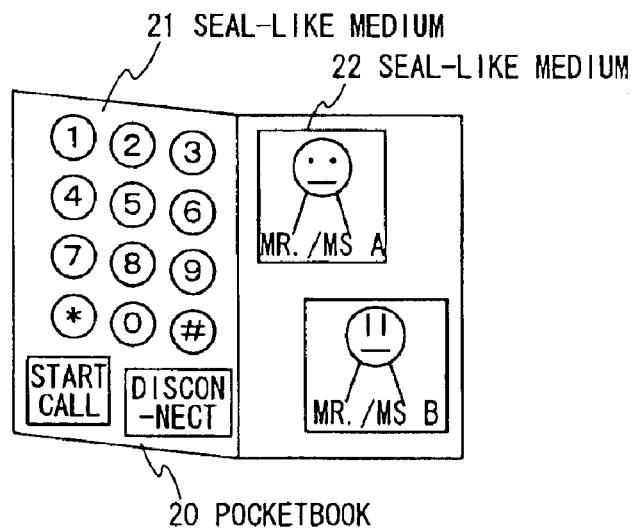

FIG. 1 shows one mode of the embodiment of the communication terminal apparatus according to the present invention, illustrating an external perspective view of the communication terminal apparatus that accesses the general public communication network. Incidentally, description will hereafter be made by taking a portable telephone as an example of the embodiment of the communication terminal apparatus.

Referring to FIG. 1, there is a communication terminal apparatus 11 comprising a speaker unit 12, and a microphone unit 13 for voice input/output, a medium read/write unit 14 that reads/writes information from/to a seal-like medium as will be described later, a button 15 that is operated when reading/writing the seal-like medium, an antenna 16 that is used to communicate with the external network, and an LCD (Liquid Crystal Display) 17 (presentation means) that displays various pieces of information.

Seal-like media 21 and 22 are pasted on, for example, a pocketbook 20, and are configured so that the information stored on them (information required to call a communicatee) can be read out by placing them in the close proximity of the medium read/write unit 14 of the communication terminal apparatus 11.

Figure 2:
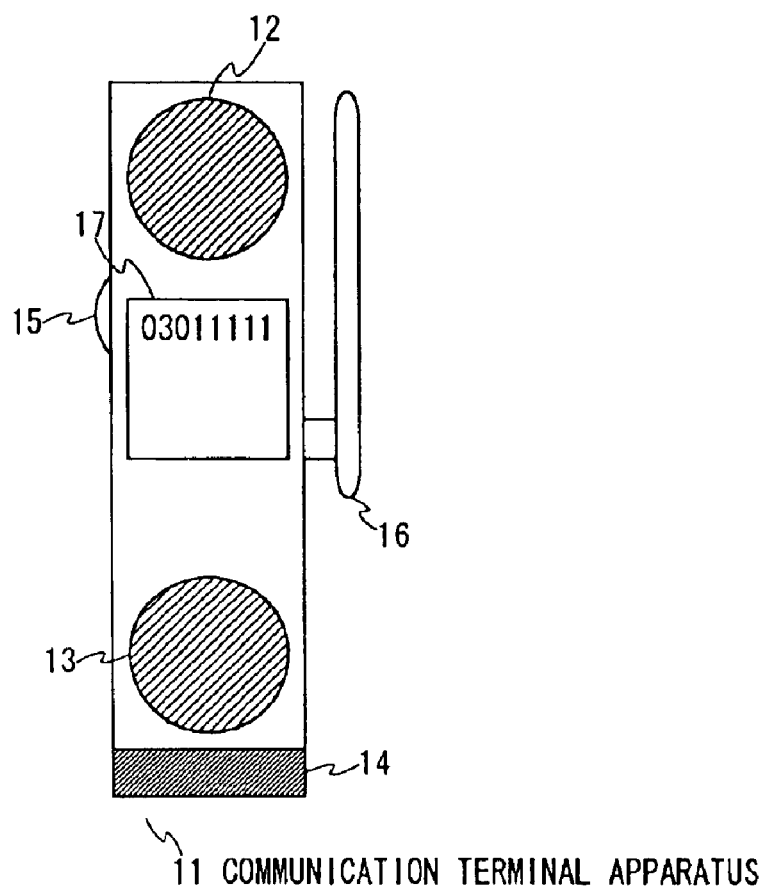
FIG. 2 is an enlarged external view of a communication terminal apparatus shown in FIG. 1.

FIG. 2 is an enlarged view of the communication terminal apparatus 11 shown in FIG. 1. Referring to FIG. 2, the speaker unit 12 converts communicatee's voice signals to voices and outputs them. The microphone unit 13 converts user's voices to corresponding electrical signals and outputs them.

If the button 15 is operated in the close proximity of the seal-like medium holding the information (to be described later), the medium read/write unit 14 writes information into the seal-like medium as well as reads out predetermined information stored in it.

The antenna 16 is used to communicate with the external network and allows for establishing a connection and communicating with a communicatee through the external network based on the information read out from the seal-like medium using the medium read/write unit 14. The LCD 17 displays the information read out from the seal-like medium, various messages, and so forth.

Next, an example of the electrical configuration of the communication terminal apparatus 11 will now be described.

Figure 3:
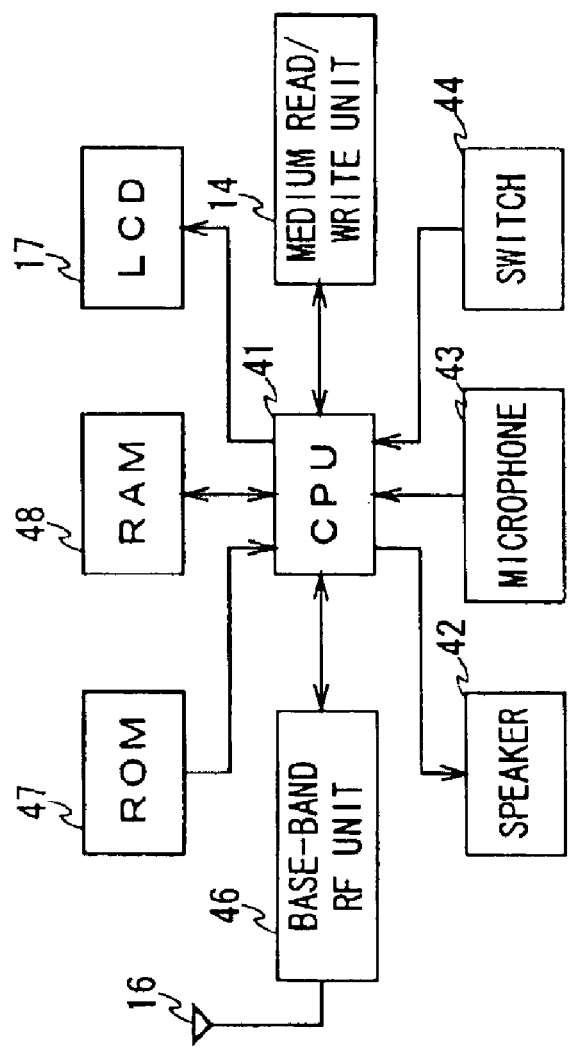
FIG. 3 is a block diagram showing an electrical configuration of the communication terminal apparatus shown in FIG. 1.

FIG. 3 is a block diagram showing an example of the electrical configuration of the communication terminal apparatus 11 shown in FIG. 1. Referring to FIG. 3, there is a CPU 41 (communication controlling means and connecting means) that controls each unit in the apparatus as well as executes various processes according to the various programs and data stored in a ROM (Read Only Memory) 47 and a RAM (Random Access Memory).

A speaker 42 is built in the speaker unit 12 and converts voice data transmitted from a communicates to corresponding voices and outputs them. Although it is not shown in this diagram, the voice data output from the CPU 41 is converted to analog signals by a D/A converter circuit, and then provided to the speaker 42 after passing through a predetermined low-pass filter, etc.

A microphone 43 converts user's voices to corresponding electrical signals. The voice signals output from the microphone 43 are converted to digital signals by an A/D converter circuit after passing through a not shown low-pass filter, and then provided to the CPU 41.

The switch 44 has an operating unit linked to the button 15, and thus if the button 15 is operated, a state being ON or OFF changes. Here, reading/writing information from/to the seal-like medium is possible only if the switch 44 is operated.

The medium read/write unit 14 (reading means, writing means) supplies electric energy to the seal-like medium by emitting radio waves, and reads/writes information from/to the seal-like medium without any contact.

A base-band RF unit 46 establishes a communication line to the communicates through the external network and transmits/receives information through the antenna 16. In addition, the ROM 47 stores various programs and data required for the CPU 41 to execute various processes. Furthermore, while the CPU 41 is executing various processes, the RAM 48 stores the running program and the data being operated and the LCD 17 displays information such as a text and an image provided from the CPU 41.

Figure 4:
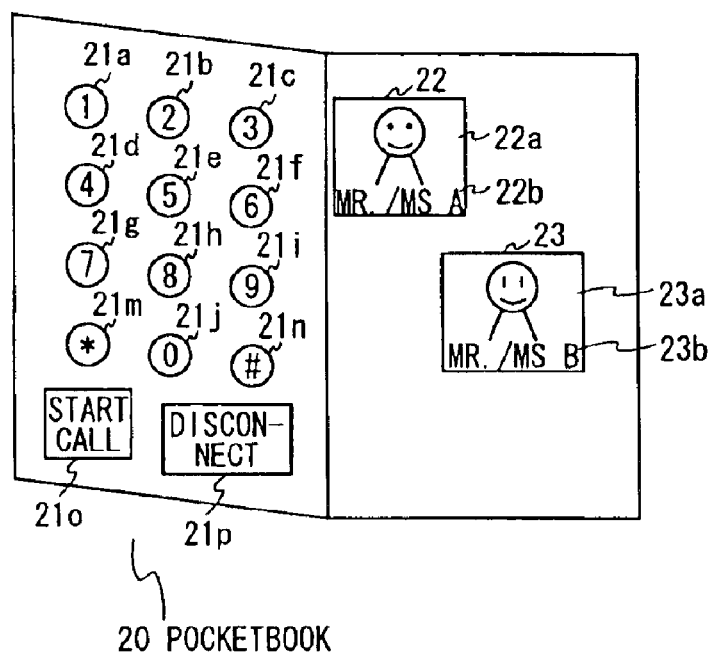
FIG. 4 is an enlarged view of a pocketbook shown in FIG. 1.
Figure 5:
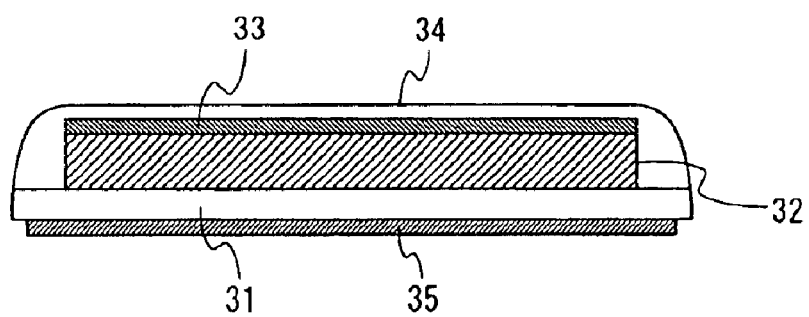
FIG. 5 is a cross-sectional view showing the cross-sectional configuration of the seal-like recording medium pasted on the pocketbook shown in FIG. 4.

With reference to FIG. 4 and FIG. 5, an example of the configuration of the seal-like medium will now be described.

FIG. 4 is an enlarged view of the pocketbook 20 shown in FIG. 1. In this example, on the left page of the pocketbook 20 are pasted seal-like media 21a to 21j for entering numerals, seal-like media 21m and 21n for entering special symbols "*" and "#," respectively, and seal-like media 21o and 21p that are operated when a call is originated and a line is disconnected, respectively. Then the user can input desired information by bringing the media read/write unit 14 of the communication terminal apparatus 11 to the close proximity of the desired seal-like media and operating the button 15.

Each of these seal-like media corresponds to an operator that is a basic unit of the operation in the communication terminal apparatus and an appropriate combination of these operators allows for any operation of the communication terminal apparatus.

On the right page are also pasted seal-like media 22 and 23 that bear printed images of communicatees. In the case of the seal-like medium 22, the image 22a and name "Mr./Ms A" (22b) of a communicatee are displayed on the front surface. In the case of the seal-like medium 23, the image 23a and name "Mr./Ms B" (23b) of another communicatee are displayed on the surface.

Telephone numbers or the like of these communicatees can be entered by operating the button 15 with one of these seal-like media in the close proximity of the medium read/write unit 14 of the communication terminal apparatus 11.

FIG. 5 is a cross-sectional view showing the internal structure of the seal-like medium. Referring to FIG. 5, there is a ground paper 31 on which a seal-like non-contact type IC card unit 32 is placed. The non-contact type IC card unit 32 comprises a built-in memory that stores information, and the information can be read/written by bringing the medium read/write unit 14 shown in FIG. 1 to the close proximity.

On the top of the non-contact type IC card unit 32 is placed a display sheet 33. On the display sheet 33 are printed some information such as letters, figures, or photograph, and the user can understand the function of each seal-like medium by referring to them.

The seal-like medium is formed with its front surface covered by a laminate layer 34 so that the seal-like medium cannot easily be disassembled. In addition, an adhesive layer 35 is provided on the back surface of the ground paper 31 of the seal-like medium, and allows the seal-like medium to be pasted anywhere at discretion. The seal-like medium may also be made removable at will by using adhesives with weak adhesion to form the adhesive layer 35.

Figure 6:
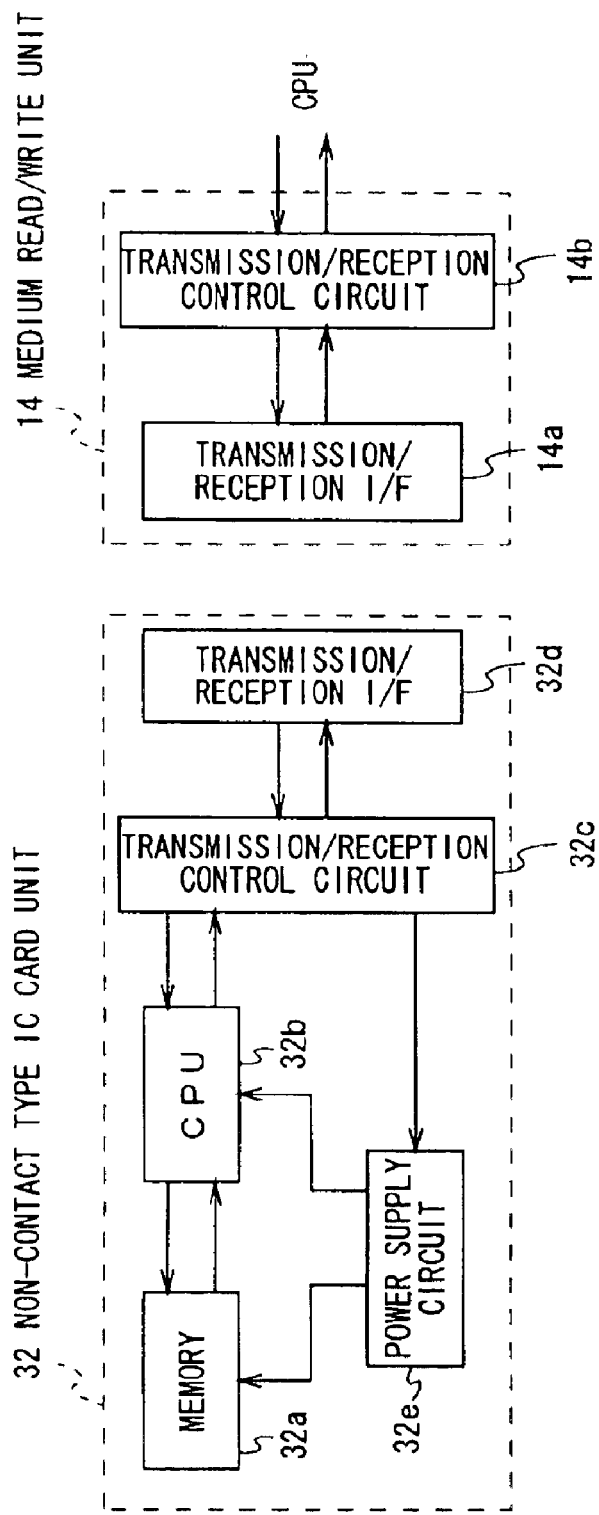
FIG. 6 is a block diagram showing one example of the configuration in detail of the medium read-out unit and the non-contact type IC card unit of the communication terminal apparatus.

With reference to FIG. 6, an example of the detailed configuration of the non-contact type IC card unit 32 in the sea-like medium shown in FIG. 5 and the medium read/write unit 14 in the communication terminal apparatus 11 shown in FIG. 3 will now be described.

The non-contact type IC card unit 32 comprises a memory 32a, a CPU 32b, a transmission/reception control circuit 32c, a transmission/reception I/F 32d, and a power supply circuit 32e. While, the medium read/write unit 14 comprises a transmission/reception I/F 14a and a transmission/reception control circuit 14b.

The memory 32a in the non-contact type IC card unit 32 records the information transmitted from the medium read/write unit 14 in the communication terminal apparatus 11, as well as reads out corresponding information when requested and outputs them. In this case, the memory 32a mainly stores information related to the telephone numbers and connecting conditions.

The CPU 32b writes the information provided by the medium read/write unit 14 of the communication terminal apparatus 11 into the memory 32a, as well as, if instructed, reads out information stored in the predetermined region within the memory 32a and provides it to the transmission/reception control circuit 32c.

The transmission/reception control circuit 32c provides the information received by the transmission/reception I/F 32d to the CPU 32b, as well as provides the information provided by the CPU 32b to the transmission/reception I/F 32d and makes it transmitted to the medium read/write unit 14.

Radio waves emitted from the medium read/write unit 14 are provided to the power supply circuit 32e through the transmission/reception I/F 32d and transmission/reception control circuit 32c and then converted to electrical signals, which are appropriately rectified and converted to DC voltage and then provided to each unit in the apparatus.

The transmission/reception I/F 14a in the medium read/write unit 14 emits radio waves to supply powers to the non-contact type IC card unit 32, as well as transmits/receives information to/from the transmission/reception I/F 32d.

The transmission/reception control circuit 14b provides the information received by the transmission/reception I/F 14a to the CPU 41, as well as provides the information provided by the CPU 41 to the transmission/reception I/F 14a and makes it transmitted to the non-contact type IC card unit 32.

These non-contact type IC cards and their read/write processes are increasingly utilized in the electric commerce field today and their configuration and operation is described in detail, for example, in Japanese Patent Laid-Open No. 10-215288.

The particular operation of the embodiment will now be described.

If the user operates the button 15 with the medium read/write unit 14 of the communication terminal apparatus 11 in the close proximity of the seal-like medium 21a shown in FIG. 4 (the medium recorded with a numeral "1"), the CPU 41 in the communication terminal apparatus 11 controls the transmission/reception control circuit 14b to make the transmission/reception I/F 14a transmit radio waves for supplying power.

As a result, in the non-contact type IC card unit 32 in the seal-like medium 21a, the transmission/reception I/F 32d receives transmitted radio waves and then the power supply circuit 32e converts them to electrical power, which is supplied to the memory 32a and CPU 32b. As a result, the memory 32a and the CPU 32b go into operation state.

The CPU 41 in the communication terminal apparatus 11 then controls the transmission/reception control circuit 14b to make the transmission/reception I/F 14a transmit the information that requests the transmission of the memory contents. As a result, in the non-contact type IC card unit 32, the transmission/reception I/F 32d receives this information and the CPU 32b obtains predetermined contents stored in the memory 32a according to the information, which is transmitted to communication terminal apparatus 11 through the transmission/reception control circuit 32c and the transmission/reception I/F 32d.

As a result, in the communication terminal apparatus 11, the transmission/reception I/F 14a receives this information and provides it to the CPU 41 through the transmission/reception control circuit 14b. The CPU 41 stores the supplied information in the predetermined region within the RAM 48.

If information is input from the seal-like medium 21o after repeating the operations described above in order to successively input a numerical string, e.g. "1234567890," the CPU 41 provides the information already entered and stored in the RAM 48 to the base-band RF unit 46 and makes it execute a calling process. As a result, a communication line is established with the communicatee whose telephone number is the numerical string "1234567890" and the conversation becomes possible.

At this stage, it is also possible to make the LCD 17 display the information that has been input to the communication terminal apparatus 11. That is, when information is received from a seal-like medium, it is sufficient for the CPU 41 to supply the information to the LCD 17 and make it displayed as well as store it in the RAM 48. In addition, it is also possible to have a voice synthesizer unit, and the information read by the medium read/write unit 14 is provided to the voice synthesizer unit and converted to corresponding voice signals, which is then provided to the user through the speaker 42.

As mentioned earlier, since the seal-like media 21a to 21j and 21m to 21p pasted on the left page of the pocketbook 20 correspond to operators, each medium is independent of each other and any consideration can be made, and thus it is possible to establish a comfortable interface according to each individual user's taste.

Next, reading process will now be described for the information stored in the seal-like media 22 and 23 pasted on the right page of the pocketbook 20 shown in FIG. 4.

The seal-like media 22 and 23 function to provide direct means for connecting a communication line. That is, on display sheets of the seal-like media 22 and 23 are printed facial photographs 22a and 23a, respectively, and at the bottom of the front surface are printed names 22b and 23b of the individuals corresponding to these facial photographs 22a and 23a, respectively.

A memory built in the non-contact type IC card unit inside the seal-like media 22 and 23 stores the information (telephone number in this case) required for connecting a line to the communicatee corresponding to a facial photograph 22a or 23a, or a name 22b or 23b.

In addition to them, the memory also stores the information describing communicatee's attributes (details will be described later). In this case, since these pieces of information are stored inside the memory by means of an electrical method, it is impossible to directly obtain them from outside.

If the button 15 is operated with the medium read/write unit 14 of the communication terminal apparatus 11 in the close proximity of the seal-like medium 22, the information stored in the seal-like medium 22 will be read out in the same procedure as described earlier.

In this case, the information to be read out includes a numerical string "1234567890" corresponding to the communicatee "Mr./Ms A's" telephone number with appended information indicating "START CALL," and the attribute information that indicates access conditions such as accessible period, accessible time period, callable count, and display/not-display telephone number.

More particularly, the accessible period represents information that indicates a period, e.g. "from Mar. 1, 1998 until Oct. 3, 1999," during which a connection to Mr./Ms A is possible. In addition, the accessible time period represents information that indicates a time period, e.g. "from 8 p.m. until 11 p.m.," during which a connection is possible.

Furthermore, the accessible count represents the number of times allowed to access Mr./Ms A and the number of times (e.g. 10 times) allowed to access Mr./Ms A by using this seal-like medium. Furthermore, the information indicating display/not-display telephone number represents the information whether the information read out by the communication terminal apparatus 11 is to be displayed on the LCD 17 to notify the user or not, and specifying not-display can prevent the user from obtaining the Mr./Ms A's telephone number. In these cases, it is also possible to indicate accessible period and time period by specifying inaccessible period and inaccessible time period.

After reading out above mentioned information from the seal-like medium 22, the communication terminal apparatus 11 determines whether the access conditions indicated by the attribute information are met or not, and then if they are met, a call to Mr./Ms A is originated.

For example, assume in the aforementioned case that the date and time is 9:10 p.m., Oct. 2, 1998 and the total call count is 8 by then when the information is read out, if access conditions are met, a call to Mr./Ms A will be originated and a communication line will be established.

In this case, since the accessible count is "10" and the call count is "8" by then, the read out accessible count is "2" (=10−8). The CPU 41 decrements the accessible count "2" by "1," and then the obtained value of "1" and the information requesting to enter this value are sent to the transmission/reception I/F 14a and transmitted to the seal-like medium 22.

In addition, in the seal-like medium 22, the transmission/reception I/F receives this information, and the CPU 32b detects that the request for entry has been received and then makes the transmitted data stored in the predetermined region within the memory. As a result, the accessible count stored in the memory is decremented by "1" to become "1."

Furthermore, the communication terminal apparatus 11 displays Mr./Ms A's telephone number on the LCD 17 only if the information indicating display/not-display telephone number read from the seal-like medium 22 specifies "display."

According to the embodiment described above, it is possible to improve the operability of the communication terminal apparatus when originating a call since a communicatee can be selected by referring to the communicatee's facial photograph printed on the seal-like medium.

In addition, it is also possible to communicate with the receiving user's convenience taken into consideration since the communicatee's access conditions are stored in the seal-like medium and a call is originated only if these conditions are met.

Furthermore, it is possible to prevent an irrelevant third party from obtaining the telephone number since the information whether or not the read out telephone number is displayed is also stored and the telephone number is displayed according to this information.

Even if the seal-like medium comes in an irrelevant third party's hand, it is also possible to prevent limitless repetition by appropriately setting accessible count, accessible period or accessible time period.

Figure 7:
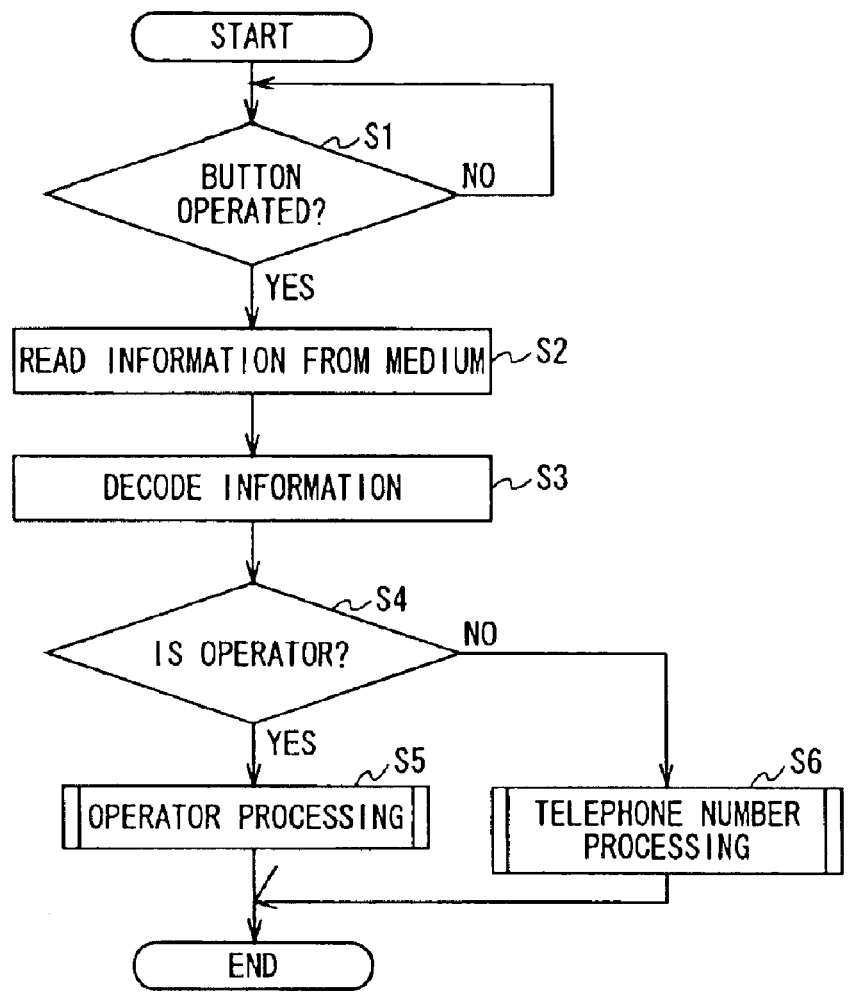
FIG. 7 is a flow chart explaining one example of the process executed in the communication terminal apparatus.
Figure 8:
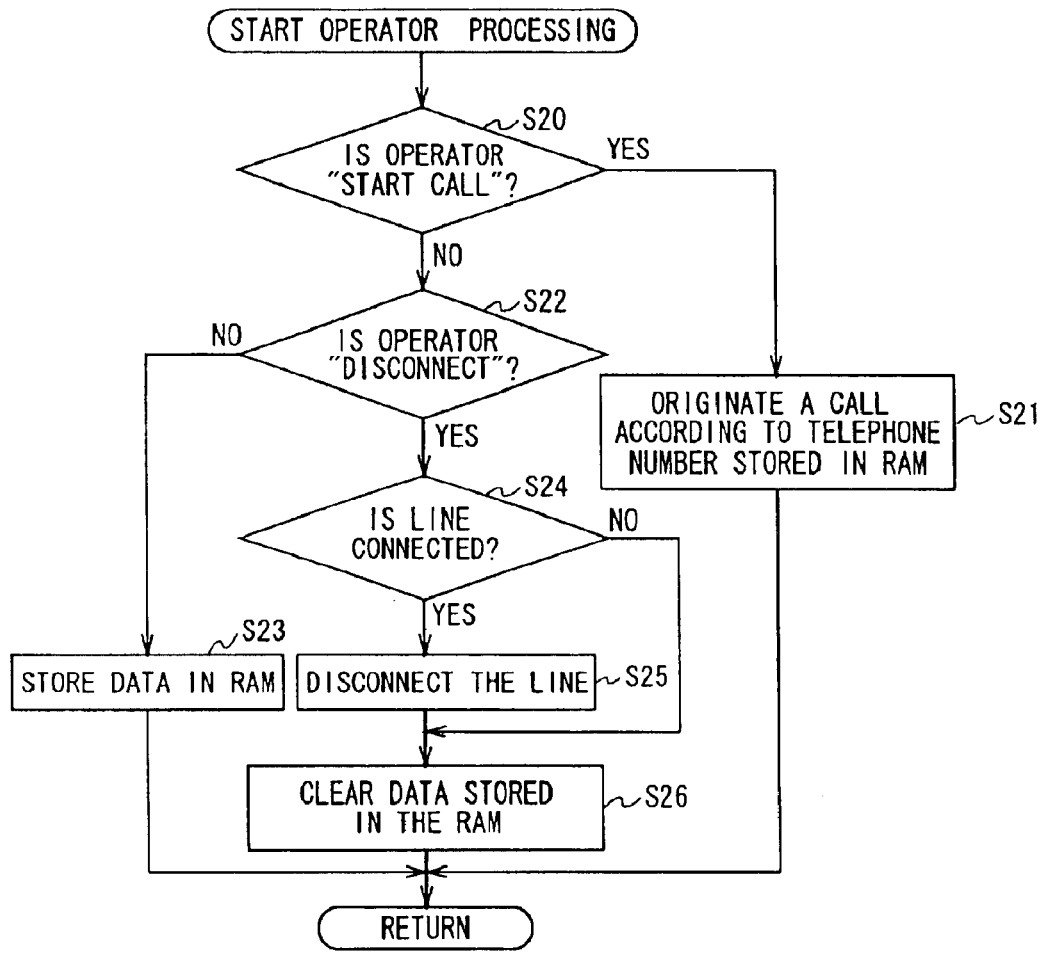
FIG. 8 is a flow chart explaining the detail of the "operator processing" shown in FIG. 7.
Figure 9:
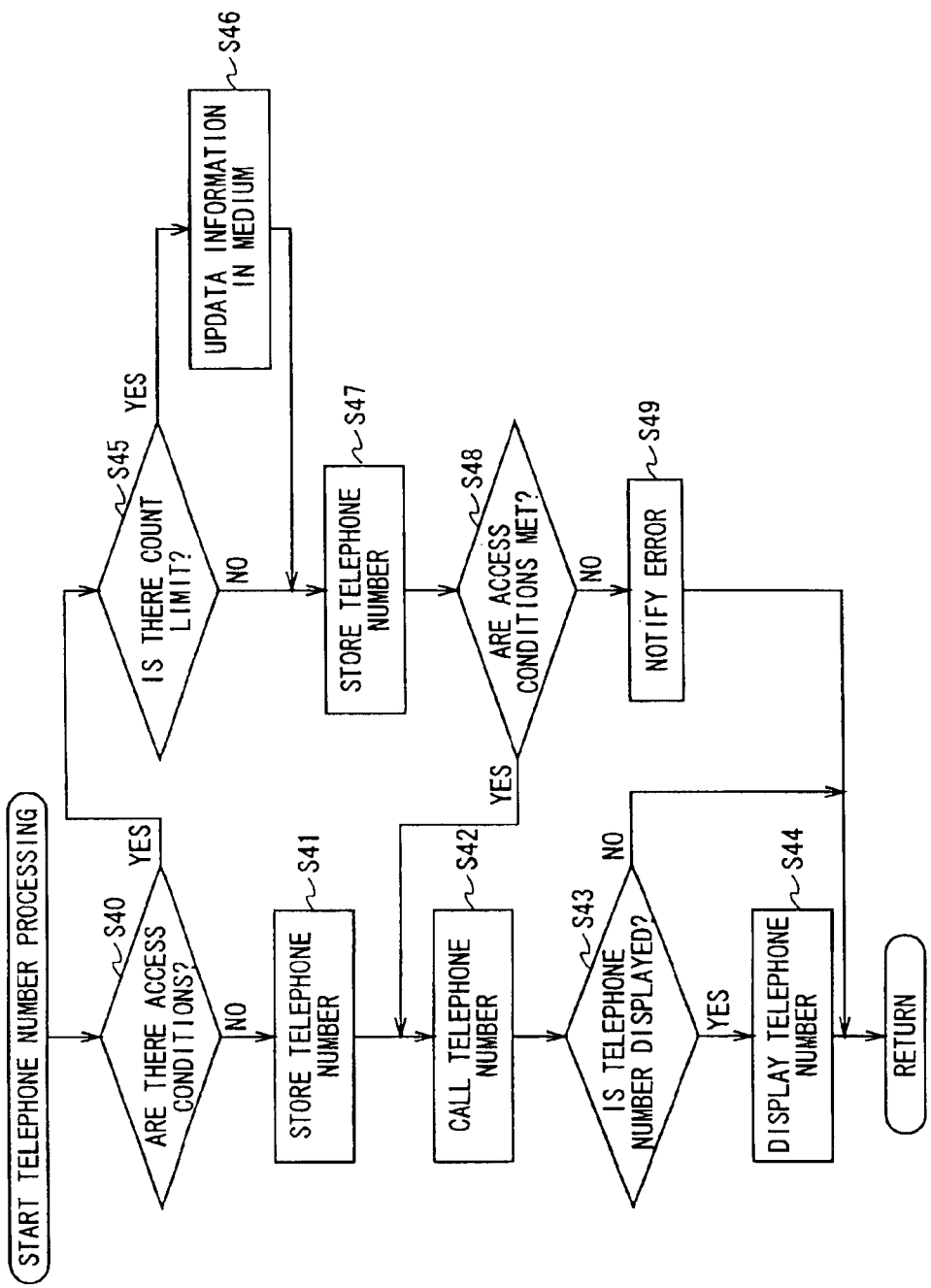
FIG. 9 is a flow chart explaining the detail of the "telephone number processing" shown in FIG. 7.

With reference to FIGS. 7 to 9, one example of flowchart that realizes above processes will now be described. Once the flowchart shown in FIG. 7 is initiated, following processes are executed;

[S1] The CPU 41 determines whether the button 15 has been operated or not by referring the output from the switch 44, and then if the button 15 has been operated, proceeds to step S2, otherwise goes back to step S1 and repeats the same process.

[S2] The CPU 41 reads out stored data from the seal-like medium through the medium read/write unit 14.

[S3] The CPU 41 decodes the read out information.

[S4] The CPU 41 determines whether the information obtained by decoding of step 3 represents an operator or not, and then if it is an operator, proceeds to step S5, otherwise (in the case of telephone number), proceeds to step S6.

That is, if the read out operation is directed to the seal-like media 21a to 21j, and 21m to 21p pasted on the left side of the pocketbook 20, it is determined to be YES and the step will proceed to S5.

[S5] The CPU 41 executes the "operator processing" or the process for operators. This process will be described later in detail referring to FIG. 8.

[S6] The CPU 41 executes the "telephone number processing" or the process for telephone numbers. This process will be described later in detail referring to FIG. 9.

Referring to FIG. 8, the "operator processing" shown in FIG. 7 will now be described in detail. Once the flowchart shown in this figure is initiated, following processes are executed;

[S20] The CPU 41 determines whether the operator obtained by step S3 in FIG. 7 represents "START CALL" or not, and then if it is START CALL, proceeds to step S21, otherwise proceeds to step S22.

[S21] The CPU 41 provides the information (a numerical string) stored in the RAM 48 to the base-band RF unit 46 and makes it execute a calling process. As a result, a communication line is established with the communicatee whose telephone number is equal to the numerical string stored in the RAM 48. Once the process is completed, the step returns to the previous process.

[S22] The CPU 41 determines whether the operator represents "DISCONNECT" or not, and then if it is DISCONNECT, proceeds to step S24, otherwise proceeds to step S23.

[S23] The CPU 41 provides the information obtained by step S3 in FIG. 7 to the RAM 48 and makes it stored, and then returns to the previous process.

[S24] The CPU 41 determines whether the line is connected or not, and then if it is connected, proceeds to step S25, otherwise proceeds to step S26.

[S25] The CPU 41 sends a predetermined control instruction to the base-band RF unit 46 and makes it execute a disconnection process. As a result, the line established with the communicatee is disconnected.

[S26] The CPU 41 clears the data stored in the RAM 48, and then returns to the previous process.

Referring to FIG. 9, the "telephone number processing" shown in FIG. 7 will now be described in detail. Once the flowchart shown in this figure is initiated, following processes will be executed;

[S40] If the information read out from the seal-like medium is accompanied with attribute information and the attribute information relates to access conditions, then the CPU 41 proceeds to step S45, otherwise proceeds to step S41.

[S41] The CPU 41 stores the information read out from the seal-like medium (telephone number) to the RAM 48.

[S42] The CPU 41 provides the telephone number that has been stored in the RAM 48 to the base-band RF unit 46 and makes it originate a call to the communicatee who has this telephone number.

[S43] The CPU 41 refers to the data contained in the attribute information that indicates whether the telephone number is displayed or not and then if the data indicates to display the telephone number, proceeds to step S44, otherwise returns to the previous process.

[S44] The CPU 41 provides the telephone number to the LCD 17 and makes it displayed, and then returns to the previous process.

[S45] The CPU 41 refers to the attribute information and then if an accessible count is set, proceeds to step S46, otherwise proceeds to step S47.

[S46] The CPU 41 decrements the accessible count that has been read out from the seal-like medium by "1" and then transmits it to the seal-like medium and makes it stored. As a result, the accessible count value stored in the seal-like medium decreases by "1" each time a call is originated.

[S47] The CPU 41 stores the obtained telephone number in the RAM 48.

[S48] The CPU 41 determines whether the access conditions that have been setup are met or not by comparing present date and time against the accessible period and accessible time period contained in the attribute information, and then if they are met, proceeds to step S42, otherwise proceeds to step S49.

[S49] The CPU 41 makes the LCD 17 display an error message "Not possible to access the communicatee requested" or the like and then returns to the previous process.

As described above, the communication terminal apparatus according to the present invention can be made smaller, since an interface that specifies the access conditions to access an external network can be formed anywhere at discretion, e.g. in a pocketbook, and independently of the communication terminal apparatus.

In addition, the user is allowed to form an interface at his/her convenient place, and thus the user can build a more comfortable operating environment.

Furthermore, since image information and a text string corresponding to a certain communicatee can be printed on the surface of the seal-like medium, a desired communicatee can be located while referring to facial photographs by using seal-like media with facial photographs and their names recorded, and thus the trouble and time experienced by the user to start communication can be reduced.

Furthermore, by storing the information for accessing a communicatee such as a telephone number in the seal-like medium, it is possible to prevent other people from easily obtaining this information and thus the prevention of leakage of the information such as a telephone number to the third party can be expected, and therefore, it is possible to avoid the reduction in security of the communicatees even if the seal-like media are distributed to other people.

Furthermore, by additionally storing conditions for accessing users, it is possible to disable a connection under predefined conditions prohibiting the connection and limit the number of connections, and thus it is possible to provide a communication environment with receiving user's convenience taken into consideration.

Although in the embodiment described above, description has been made by taking a portable telephone as an example of the communication terminal apparatus, the present invention is not limited to this, but widely applicable to any communication terminal; for example, personal computer that is accessible to the Internet and portable type information terminal apparatus. In this case, it is sufficient to prepare seal-like media corresponding to operators such as those for alphabet, special symbol and special function buttons. Information stored in these seal-like media may include not only telephone numbers (telephone numbers of service providers, etc.) but also URLs used in the Internet or the like.

In addition, although in the embodiment described above, the read/write unit for the seal-like medium is provided as a part of the communication terminal apparatus, the present invention is not limited to this configuration, but it is not necessarily required to be unitized. For example, a medium read/write unit can also be provided so that it is detachable from the communication terminal apparatus and capable of transmitting/receiving information to/from the communication terminal apparatus via wireless or cable line to read/write the information from/to the seal-like medium.

Furthermore, although in the embodiment described above, the description has been made for the case that the communicatee's attribute information recorded in the seal-like medium 22 is directed to access conditions such as accessible period, accessible time period, callable count, and display/not-display telephone number, the present invention is not limited to this case, but the communicatee's attribute information recorded on the seal-like recording medium 22 can also be directed to the positions where the communication with the communicatee is possible or positions where the communication is not possible.

In this case, the communication terminal apparatus 11 is loaded with a function that identifies or detects its own position based on the information transmitted from a base station (base station where PHS radio waves are received, etc.) and related to the position of the communication terminal apparatus 11, GPS (Global Positioning System) or the like, and then the communication terminal apparatus 11 can be built so that the CPU 41 executes a process for connecting a communication line to the communicatee only if the position of the communication terminal apparatus 11 based on the information of the position, either identified or detected, is a position permitted by the attribute information (i.e. position where the communication is possible).

INDUSTRIAL APPLICABILITY

The present invention can be widely applicable to portable telephones, PHSs, portable type personal computers, and so forth.

What is claimed is:

1. A communication terminal apparatus that is connected to a communicatee through a communication line and transmits/receives information to/from said communicatee, comprising:

communication controlling means that executes controls required for the transmission/reception of information through said communication line;

read-out means to read out information recorded on a seal-like recording medium pasted anywhere at the discretion of a user; and connecting means that connects a communication line to the communicatee corresponding to the information read out by said read-out means, wherein said seal-like recording medium includes adhesives applied to a back surface to allow for pasting anywhere at the discretion of the user and includes information displayed on a front surface thereof to indicate recorded contents, and information required for the connection to said communicatee is recorded on said seal-like recording medium, and on the front surface of said seal-like recording medium an image indicating said communicatee is displayed, and attribute information related to said communicatee is further recorded on said seal-like recording medium, and said connecting means executes a process for the connection to said communicates according to said attribute information, and said attribute information represents periods of time during which the connection to said communicatee is one of possible and periods of time during which the connection to said communicatee is impossible, and said connecting means executes said process for connecting the communication line to the communicatee only when a present date and time is within the periods of time permitted by said attribute information.

2. The communication terminal apparatus according to claim 1, wherein information recorded on said seal-like recording medium corresponds to operators of said communication terminal apparatus.

3. A communication terminal apparatus that is connected to a communicatee through a communication line and transmits/receives information to/from said communicatee, comprising:

communication controlling means that executes controls required for the transmission/reception of information through said communication line;

read-out means to read out information recorded on a seal-like recording medium pasted anywhere at the discretion of a user; and connecting means that connects a communication line to the communicates corresponding to the information read out by said read-out means, wherein said seal-like recording medium includes adhesives applied to a back surface to allow for pasting anywhere at the discretion of the user and includes information displayed on a front surface thereof to indicate recorded contents, and information required for the connection to said communicatee is recorded on said seal-like recording medium, and on the front surface of said seal-like recording medium an image indicating said communicatee is displayed, and attribute information related to said communicates is further recorded on said seal-like recording medium, and said connecting means executes a process for the connection to said communicatee according to said attribute information, and said attribute information represents one of information about positions from where said communicatee is accessible and information about positions from where said communicatee is inaccessible, and said connecting means executes said process for connecting the communication line to the communicatee only when a present position is a position permitted by said attribute information.

4. The communication terminal apparatus according to claim 1, further comprising presentation means that presents information read out by said read-out means.

5. The communication terminal apparatus according to claim 4, wherein said presented information is further recorded on said seal-like recording medium to indicate whether the read out information is presented, and said presentation means determines whether the information is presented according to said presentation control information.

6. The communication terminal apparatus according to claim 1, further comprising writing means that writes predetermined information on said seal-like recording medium.

7. The communication terminal apparatus according to claim 6, wherein an access count to the communicates is further recorded on said seal-like recording medium, and only when said access count read out by said read-out means is not "0," the communication line is connected to said communicatee by said connecting means as well as its value is decremented by "1" and written to said seal-like recording medium by said writing means.

8. The communication terminal apparatus according to claim 1, wherein a semiconductor memory is built in said seal-like recording medium and recorded contents of said semiconductor memory are read and written in a contactless manner.

* * * * *